No. 742,324. Patented October 27, 1903.

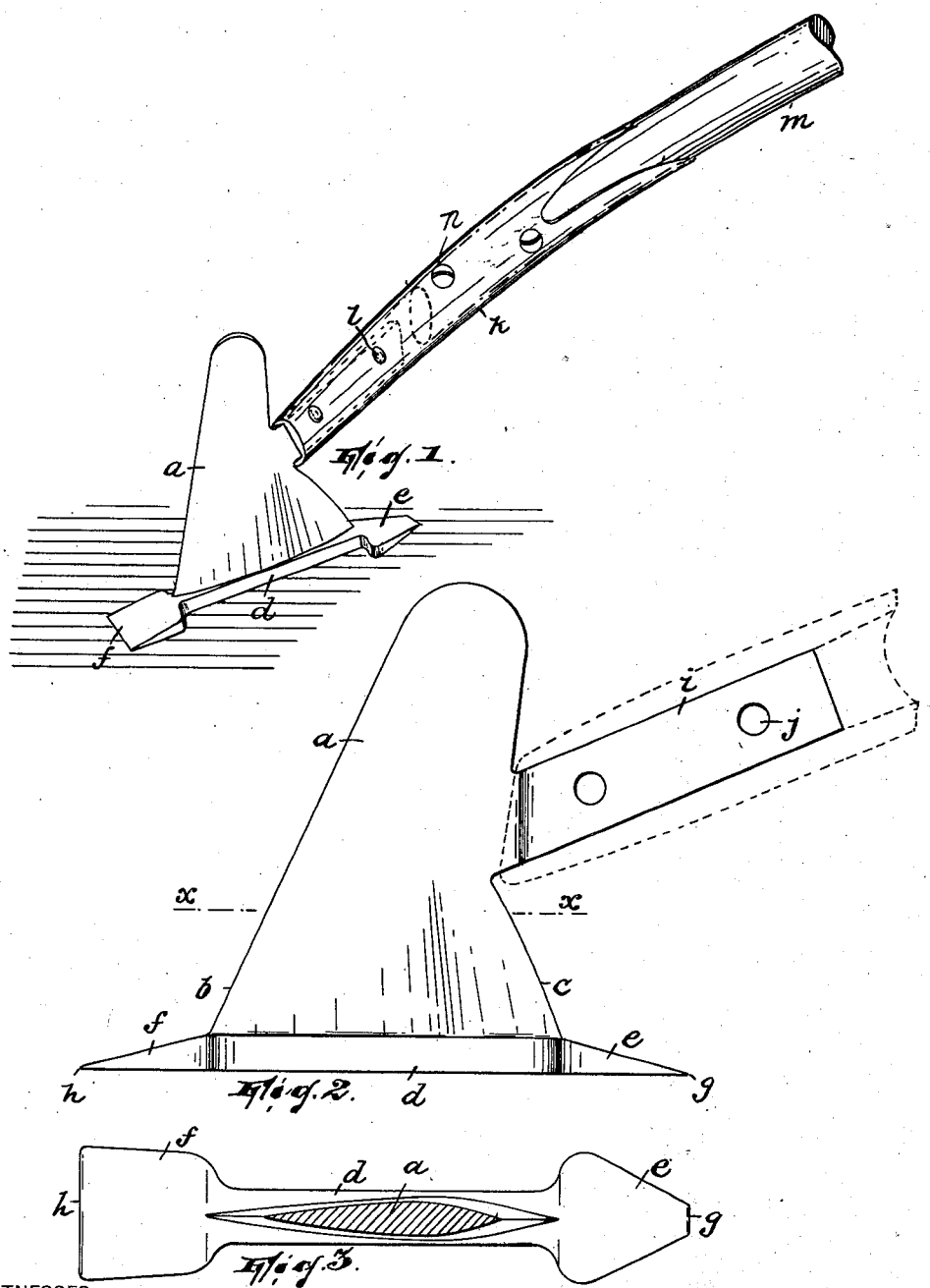

UNITED STATES PATENT OFFICE.

JAMES C. HOWLEY AND DANIEL W. McFADYEN, OF PATERSON, NEW JERSEY.

TOOL FOR REMOVING TIN ROOFING.

SPECIFICATION forming part of Letters Patent No. 742,324, dated October 27, 1903.

Application filed March 31, 1903. Serial No. 150,374. (No model.)

*To all whom it may concern:*

Be it known that we, JAMES C. HOWLEY and DANIEL W. McFADYEN, citizens of the United States, residing in Paterson, in the county of Passaic and State of New Jersey, have invented certain new and useful Improvements in Tools for Removing Tin Roofing; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide an implement for removing tin roofing, such an implement being of considerable usefulness, especially to firemen, where it is necessary to remove a tin roof quickly.

Our invention will be found fully illustrated in the accompanying drawings, wherein—

Figure 1 is a perspective view thereof; Fig. 2, a view in side elevation, and Fig. 3 a horizontal sectional view on the line $x\,x$ in Fig. 2.

$a$ designates a flat blade having its edge portions $b$ and $c$, particularly at the lower portion of the blade, sharpened. $d$ is an elongated plate which preferably forms an integral extension of the lower or base portion of the blade. Plate $d$ is extended at both ends, so that it projects at this point quite a little past the adjacent edge $b$ or $c$ of the blade. The extensions $e$ and $f$ thus produced are preferably wider than the plate and are formed with cutting edges $g$ and $h$, respectively. Extension $e$ is tapered, so that edge $g$ is, in effect, reduced in width.

$i$ is a shank formed integral with the blade $a$ and provided with openings $j$. This shank is received by a socket $k$, which carries rivets $l$, adapted to penetrate openings $j$ to fix the blade to the socket, and $m$ is a handle which is received by the other end of the socket and may be secured therein by screws $n$ or any other desired means.

In using the tool one of its ends, preferably the pointed one, is driven through the tin, thus starting the cut. The implement is then manipulated so as to bring the adjacent cutting edge $c$ into cutting engagement with the tin. By a continuous pull or push on the implement a long clean gash may be cut in the tin at a single stroke, the plate $d$ coacting to guide the implement and keep it in cutting position, it being noticed that the plate is slightly wider than the blade is thick.

Having thus fully described our invention, what we claim as new, and desire to secure by Letters Patent, is—

1. The combination of a blade, a handle, said blade having a cutting edge arranged in a line intersecting that of the handle, and a guiding device arranged at the base, and forming an integral part, of the blade, and being wider than the adjacent portion of the blade is thick, substantially as described.

2. The combination of a blade, a handle, said blade having a cutting edge arranged in a line intersecting that of the handle, and a guiding device arranged at the base, and forming an integral part, of the blade, said guiding device being wider than the base portion of the blade is thick and also being of greater length than said base portion of the blade, substantially as described.

3. The combination of a blade, a handle, said blade having oppositely-disposed cutting edges arranged in lines intersecting that of the handle, a guiding device arranged at the base, and forming an integral part, of the blade, said guiding device being wider than the adjacent portion of the blade is thick and having its ends extending beyond the edges of said blade, substantially as described.

In testimony that we claim the foregoing we have hereunto set our hands this 28th day of March, 1903.

JAMES C. HOWLEY.
DANIEL W. McFADYEN.

Witnesses:
JOHN W. STEWARD,
ROBERT J. POLLITT.